(12) United States Patent
West et al.

(10) Patent No.: US 12,436,200 B2
(45) Date of Patent: Oct. 7, 2025

(54) BATTERY LOAD TEST IN AGRICULTURAL UTILITY VEHICLE

(71) Applicant: DEERE & COMPANY, Moline, IL (US)

(72) Inventors: Sean P. West, Cedar Falls, IA (US); Joseph P. Boyer, Cedar Falls, IA (US); Christopher D. Jensenius, Janesville, IA (US); Shane M. Boden, Vinton, IA (US); Jeff L. Lubben, Hudson, IA (US)

(73) Assignee: Deere & Company, Moline, IL (US)

( * ) Notice: Subject to any disclaimer, the term of this patent is extended or adjusted under 35 U.S.C. 154(b) by 85 days.

(21) Appl. No.: 18/583,353

(22) Filed: Feb. 21, 2024

(65) Prior Publication Data

US 2025/0264543 A1 Aug. 21, 2025

(51) Int. Cl.
*G01R 31/392* (2019.01)
*B60R 16/033* (2006.01)
(Continued)

(52) U.S. Cl.
CPC .......... *G01R 31/392* (2019.01); *B60R 16/033* (2013.01); *B60R 16/08* (2013.01);
(Continued)

(58) Field of Classification Search
CPC .. G01R 31/392; G01R 31/382; G01R 31/374; G01R 31/367; B60R 16/033; B60R 16/08; B62D 5/062; G07C 5/008
(Continued)

(56) References Cited

U.S. PATENT DOCUMENTS 6,268,732 B1  7/2001  Jones et al.
6,885,195 B2  4/2005  Bertness
(Continued)

FOREIGN PATENT DOCUMENTS

EP       4194681 A1      6/2023
WO   WO-2006054066 A1 *  5/2006  ........... G01R 31/367

OTHER PUBLICATIONS

John Deere Starting and Charging Theory of Operation, pp. 1-4.
(Continued)

*Primary Examiner* — Adam R Mott
*Assistant Examiner* — Ellis B. Ramirez
(74) *Attorney, Agent, or Firm* — Lucian Wayne Beavers; Patterson Intellectual Property Law PC (57) ABSTRACT

An onboard battery load test system for a utility vehicle. The onboard battery load test system includes a vehicle battery, a primary pump disposed in a fluid circuit and configured to pressurize a fluid in the fluid circuit, a backup pump disposed in the fluid circuit as a redundancy to the primary pump, at least one battery sensor operable to generate a battery sensor signal representative of a condition of the vehicle battery, and a controller operatively coupled with the at least one battery sensor. The controller includes a processor, a memory device operatively coupled with the processor, and battery load test logic stored in the memory device and being executable via the processor to determine health of the vehicle battery by: initiating a current draw on the vehicle battery by the backup pump, receiving the battery sensor signal, and determining the battery health based on the battery sensor signal.

7 Claims, 5 Drawing Sheets

(51) Int. Cl.
  *B60R 16/08* (2006.01)
  *B62D 5/06* (2006.01)
  *G01R 31/374* (2019.01)
  *G01R 31/382* (2019.01)
  *G07C 5/00* (2006.01)

(52) U.S. Cl.
  CPC ........... *B62D 5/062* (2013.01); *G01R 31/374* (2019.01); *G01R 31/382* (2019.01); *G07C 5/008* (2013.01)

(58) Field of Classification Search
  USPC ............ 701/293; 702/63; 340/636.1, 636.12, 340/636.14, 636.16
  See application file for complete search history.

(56) References Cited

U.S. PATENT DOCUMENTS

| | | | |
|---|---|---|---|
| 8,103,485 B2 * | 1/2012 | Plett | H01M 10/48 |
| 8,818,611 B2 | 8/2014 | Shin et al. | |
| 9,050,999 B2 | 6/2015 | Kuipers et al. | |
| 9,248,854 B2 | 2/2016 | Belshan et al. | |
| 10,746,151 B2 | 8/2020 | Chen et al. | |
| 2002/0036504 A1 * | 3/2002 | Troy | G01R 31/389 |
| 2005/0001566 A1 * | 1/2005 | Bell | B66F 11/044 |
| 2005/0182536 A1 | 8/2005 | Doyle et al. | |
| 2007/0239374 A1 * | 10/2007 | Dougherty | G01R 31/392 |
| 2007/0256884 A1 | 11/2007 | Wilhelm Rekow et al. | |
| 2008/0084229 A1 * | 4/2008 | Frommer | G01R 31/34 |
| 2008/0087014 A1 | 4/2008 | Schick et al. | |
| 2008/0091319 A1 | 4/2008 | Schick et al. | |
| 2009/0027056 A1 * | 1/2009 | Huang | G01R 31/392 |
| 2010/0090650 A1 * | 4/2010 | Yazami | H01M 10/486 |
| 2010/0121587 A1 * | 5/2010 | Vian | H01M 10/48 |
| 2013/0046435 A1 | 2/2013 | Shin et al. | |
| 2016/0039291 A1 * | 2/2016 | Reese | G07C 5/0841 |
| 2016/0266211 A1 * | 9/2016 | Imaizumi | G01R 31/389 |
| 2018/0134168 A1 * | 5/2018 | Keller | H02J 7/007182 |
| 2019/0285041 A1 | 9/2019 | Chen et al. | |
| 2021/0075245 A1 * | 3/2021 | Phadtare | F02N 11/0862 |
| 2022/0136498 A1 | 5/2022 | Ramsey et al. | |
| 2023/0175926 A1 | 6/2023 | Wilcox et al. | |
| 2023/0391226 A1 | 12/2023 | Liu et al. | |

OTHER PUBLICATIONS

John Deere Backup Pump Startup Checks, pp. 1-2.
John Deere Power Supply Theory of Operation, pp. 1-3.
Image of control system, p. 1.
Xinyu Du et al., Development of Robust Fault Signatures for Battery and Starter Failure Prognosis, Annual Conference of the Prognostics and Health Management Society 2018, pp. 1-9.
John Deere 8RT Tractors—Diagnostic Technical Manual, dated Oct. 18, 2023, pp. 1-6.
BU-902: How to Measure Internal Resistance, pp. 1-5.

* cited by examiner

BATTERY LOAD TEST IN AGRICULTURAL UTILITY VEHICLE

FIELD OF DISCLOSURE

The present disclosure relates to an agricultural vehicle having a battery and to onboard battery testing therefor.

BACKGROUND

Utility vehicles generally include one or more batteries to power one or more vehicle components or systems. Over time, the ability of a battery to generate required current (even when fully charged) diminishes. Testing the battery can determine when the battery needs to be replaced.

SUMMARY

The disclosure relates to battery prognostics and onboard testing for battery health.

Battery load testing may provide a measure of a battery's ability to generate high current. Load testing may include isolating the battery circuit and generating a high load test condition that draws on the battery while the battery circuit is isolated. During the high load draw, data is measured to determine the health of the battery.

In one aspect, the disclosure provides an onboard battery load test system for a utility vehicle. The onboard battery load test system includes a vehicle battery, a primary pump disposed in a fluid circuit and configured to pressurize a fluid in the fluid circuit, a backup pump disposed in the fluid circuit as a redundancy to the primary pump, at least one battery sensor operable to generate a battery sensor signal representative of a condition of the vehicle battery, and a controller operatively coupled with the at least one battery sensor. The controller includes a processor, a memory device operatively coupled with the processor, and battery load test logic stored in the memory device and being executable via the processor to determine health of the vehicle battery by: initiating a current draw on the vehicle battery by the backup pump, receiving the battery sensor signal, and determining the battery health based on the battery sensor signal.

In another aspect, the disclosure provides an onboard battery load test system for a utility vehicle. The onboard battery load test system includes a vehicle battery, at least one battery sensor configured to generate signals representative of battery current, battery voltage, and battery temperature, and a controller operatively coupled with the at least one battery sensor. The controller includes a processor, a memory device operatively coupled with the processor, and battery load test logic stored in the memory device and being executable via the processor to determine health of the vehicle battery by: initiating a current draw on the vehicle battery, receiving the battery current, battery voltage, and battery temperature signals during the current draw, and determining the battery health based on the battery current, battery voltage, and battery temperature signals.

In yet another aspect, the disclosure provides a method for conducting an onboard battery load test to determine health of a vehicle battery in a utility vehicle. The method includes generating, by at least one onboard battery sensor, a battery sensor signal representative of a condition of the vehicle battery. The method also includes executing, via a processor of a controller, battery load test logic stored in a memory device of the controller to determine health of the vehicle battery by: initiating a current draw on the vehicle battery, receiving the battery sensor signal during the current draw, and determining the battery health based on the battery sensor signal.

Other aspects of the disclosure will become apparent by consideration of the detailed description and accompanying drawings.

DETAILED DESCRIPTION

Over time, a battery can lose its ability to generate a high current and needs replacing. Battery load testing may provide a measure of a battery's ability to generate high current. For example, load testing the battery over time provides a picture of battery health. Load testing may include isolating the battery circuit and generating a high load test condition that draws on the battery while the battery circuit is isolated. During the high load current draw, data is measured to determine the health of the battery.

The battery may be part of a utility vehicle having a vehicle alternator connectable to charge the battery. The utility vehicle may have one, two, or more batteries capable of being tested in accordance with the disclosure. Though only one battery need be described herein, it should be understood that the same arrangement and method may be applied to additional batteries in the circuit. Isolating the battery circuit separates the battery from charge current supplied by the vehicle alternator. In some implementations, the alternator may be set to an OFF condition in order to run the battery load test. While the battery is isolated, the battery current may be drawn by a high load component of the vehicle. The battery may continue to power a first set of vehicle components (including controllers as one example) while isolated for the load test. A second set of vehicle components runs directly on the alternator while the battery is isolated. Once the battery is free of charge current, the high load test condition may be generated by turning on the high load component. This simulates an electric starter-like load of the engine at vehicle startup but reduces the impact of variables associated with vehicle startup that can skew battery health test results, such as engine friction and starter health. Using the high load component to conduct a battery load test while the vehicle engine is running (as opposed to using the load of vehicle engine startup) provides a more consistent load on the battery during testing, though the battery load test could also be executed while the engine is not running to achieve a consistent load. Knowledge about the battery health gleaned from the test being performed outside of vehicle engine startup also provides information that is useful for diagnosing issues during the next vehicle engine startup. For example, having battery health data from the last time the vehicle was running can allow diagnostics to count or discount the battery as contributing to any issue detected during the next vehicle engine startup.

The high load component may be, for example, a pump, a heater, and implement, or other component that draws high current. "High current" may be defined in any suitable way, e.g., in straight amps or as a percentage of the battery cold cranking amps (CCA) rating. (In examples where more than one battery is tested at the same time, the CCA ratings of the batteries should be added together.) In one example, "high current" may mean at least 90 amps, or at least 190 amps in another example. In another example, "high current" may mean at least 10% of the battery CCA rating. In other examples, "high current" may mean at least 12% of the battery CCA rating, at least 15% of the battery CCA rating, etc.

A high load may additionally or alternatively be defined by momentary current and/or steady state current. Momentary current typically occurs at startup and is generally higher than the steady state current that is reached after startup. The high load may be 90 or more amps momentary current in some examples, 190 or more amps momentary current in other examples, 300 or more amps momentary current in other examples, 400 or more amps momentary current in yet other examples, 500 or more amps momentary current in yet other examples, 600 or more amps momentary current in further examples, 700 or more amps momentary current in yet other examples, etc. The high load may be 50 or more amps steady state current in some examples, 100 or more amps steady state current in other examples, 200 or more amps steady state in other examples, 300 or more amps steady state in yet other examples, 400 or more amps steady state in other examples, 500 or more amps steady state in yet other examples, etc.

The pump may be, for example, a backup pump. The backup pump may be, for example, a hydraulic pump, a pneumatic pump, etc. In one example, the backup pump may be a backup hydraulic steering and/or braking pump. (It should be understood that steering and braking may utilize the same hydraulic fluid and the terms may therefore be used interchangeably herein. For example, a "steering pump" may additionally or alternatively encompass a "braking pump" and vice versa.) The backup pump is a redundancy should a primary pump fail or need to be brought offline. Using a backup pump advantageously allows the test to occur while the engine of the vehicle is running and without disruption to the operation of the vehicle, though it is possible to run the test using other high load components and obtain useful results.

The measured data may include battery current, battery voltage, and battery temperature. The battery measurements are indicative of the internal resistance of the battery, which increases with battery age. A high internal resistance of the battery results in a diminished ability of the battery to generate high current and suggests that battery replacement would be advantageous. In some examples, steering fluid pressure may also be measured. The steering fluid pressure measurement indicates whether the steering fluid pump (e.g., the backup steering fluid pump being used for the battery load test) is functioning properly and thus helps determine whether the battery load test results are indicative of battery health or a faulty pump.

Before any constructions of the disclosure are explained in detail, it is to be understood that the disclosure is not limited in its application to the details of construction and the arrangement of components set forth in the following description or illustrated in the accompanying drawings. The disclosure is capable of supporting other constructions and of being practiced or of being carried out in various ways.

Figure 1:
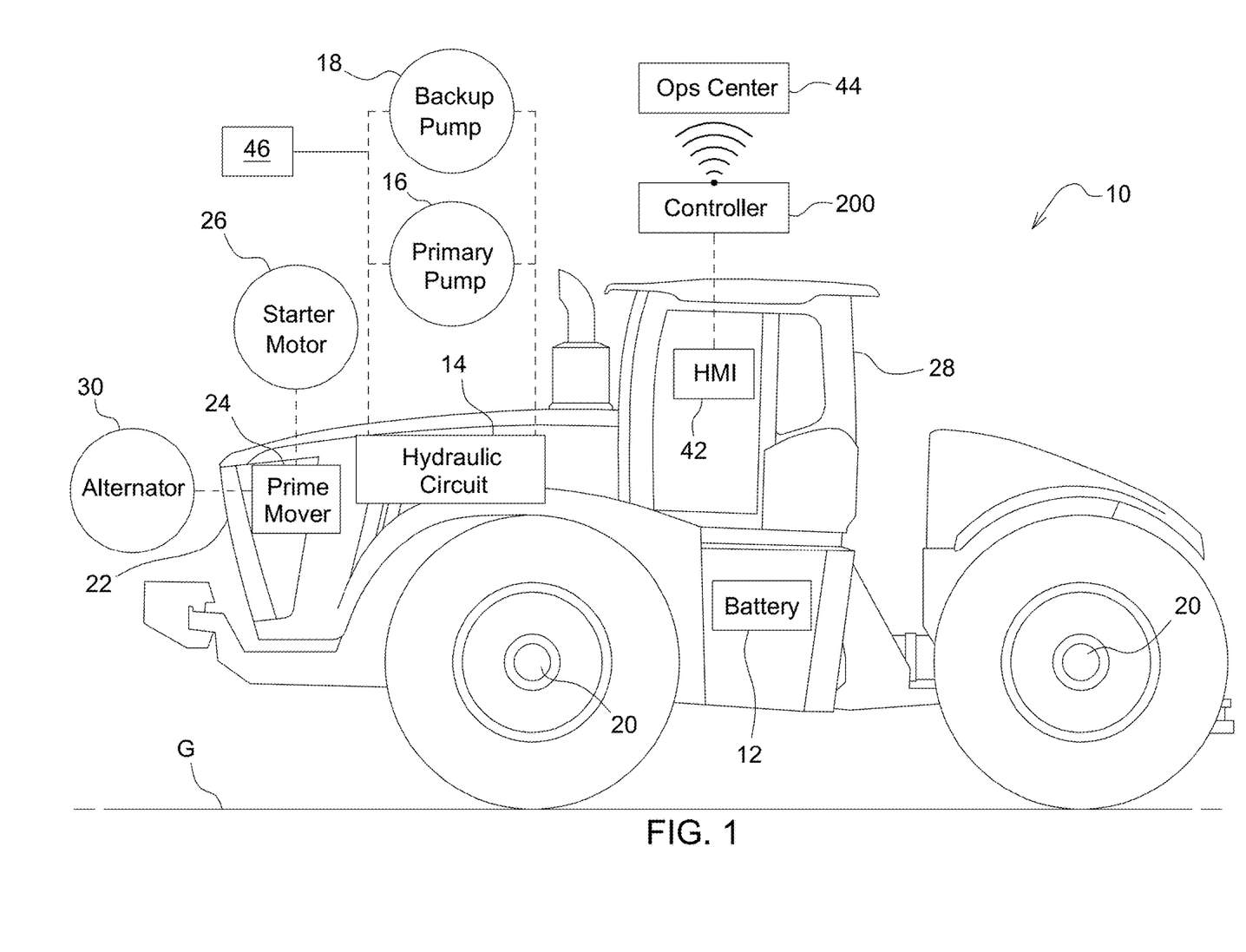
FIG. 1 is a side view of a utility vehicle, such as a tractor, having a battery load test system in accordance with one implementation of the present disclosure.

FIG. 1 illustrates a utility vehicle 10 having at least one battery 12 and a pressurized fluid circuit 14, such as a hydraulic circuit. While reference may be made herein to the pressurized fluid circuit 14 being a hydraulic circuit, it should be understood that the pressurized circuit 14 may alternatively be a pneumatic circuit, or any other pressurized fluid circuit. The utility vehicle 10 may be embodied as an agricultural vehicle, a construction vehicle, a forestry vehicle, a mining vehicle, or any other utility vehicle having a pressurized fluid circuit 14. In the illustrated example of FIG. 1, the utility vehicle 10 may be an agricultural tractor.

The battery 12 may have any suitable rechargeable chemistry, such as a lithium-ion chemistry or a nickel-cobalt-aluminum (NCA) chemistry. The term "battery," as appearing herein, is utilized in a broad sense to refer to any rechargeable battery, rechargeable battery pack, rechargeable battery apparatus or device, rechargeable energy storage device, regardless of the number and type of individual cells contained therein.

The pressurized fluid circuit 14 may include a primary pump 16 and a backup pump 18. The primary pump 16 mainly pressurizes fluid in the circuit 14, and the backup pump 18 is a redundancy in case of failure of the primary pump 16 or in case the engine stops running while the vehicle is still moving. Under normal operating conditions, the primary pump 16 pressurizes fluid in the pressurized fluid circuit 14 and the backup pump 18 is in an OFF condition. The backup pump 18 may be electrically driven and operable to pressurize fluid in the pressurized fluid circuit 14 when the primary pump 16 is inactive (e.g., is suffering performance issues, is isolated from the circuit 14, is in an OFF condition, or when the engine is not running, etc.). The backup pump 18 may be fluidly arranged in parallel with the primary pump 16 in the circuit 14.

In some implementations, the primary pump 16 is engine driven (e.g., driven by a prime mover 24). In other implementations, the primary pump 16 may be driven electrically.

The utility vehicle 10 may include a plurality of wheels 20, such as wheels with tires or tracks for engaging the ground G, and a chassis 22 supported by the wheels 20. In some implementations, the utility vehicle may include the prime mover 24 for powering tractive effort. The prime mover 24 may include an internal combustion engine, an electric vehicle battery, or any other suitable source of power for tractive effort. The prime mover 24 may be operatively coupled to a starter motor 26 for starting the prime mover 24. In the illustrated example, the utility vehicle 10 may also include a cabin 28 supported by the chassis 22.

Figure 2:
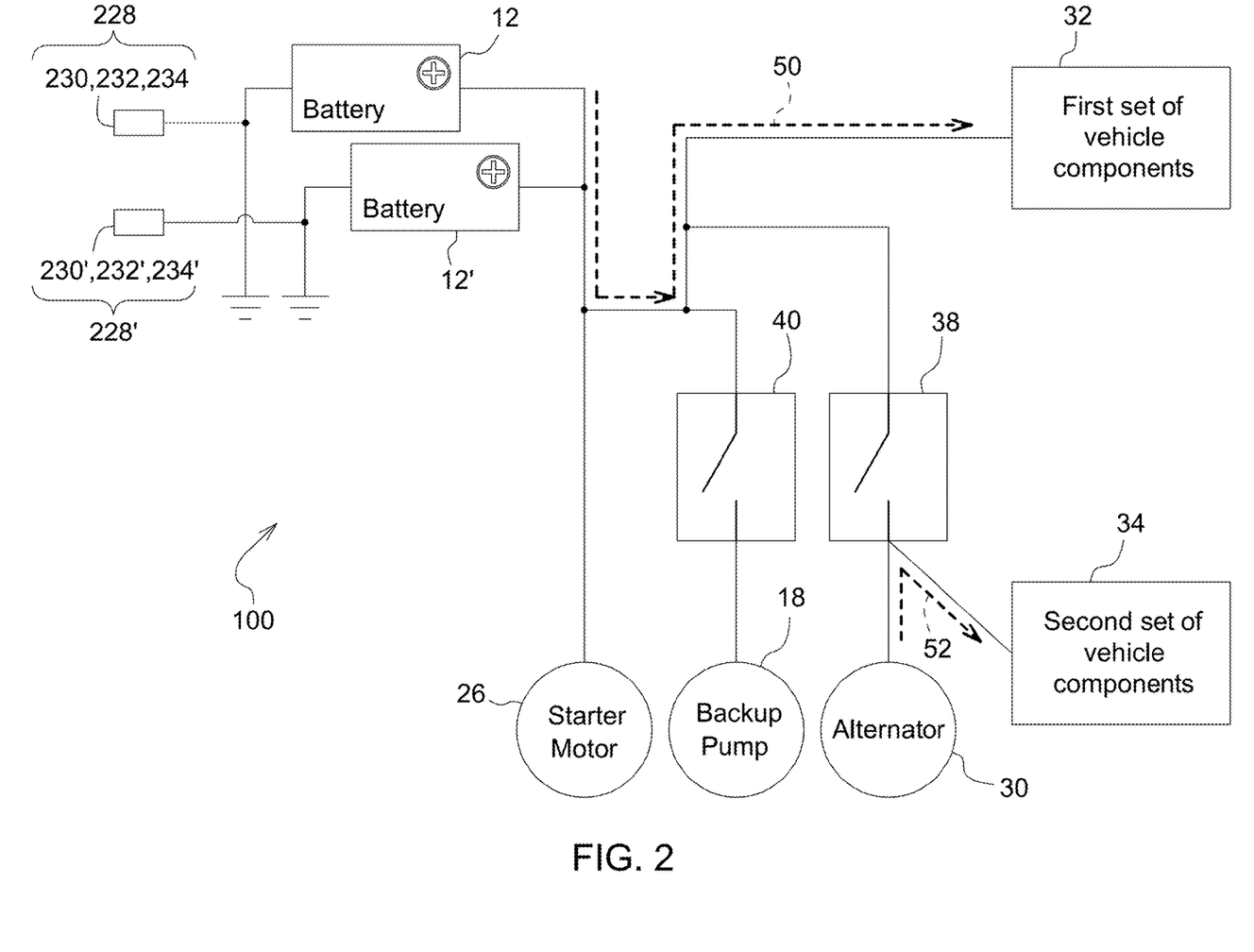
FIG. 2 is a schematic diagram illustrating a first condition of the battery load test system of the utility vehicle of FIG. 1.
Figure 3:
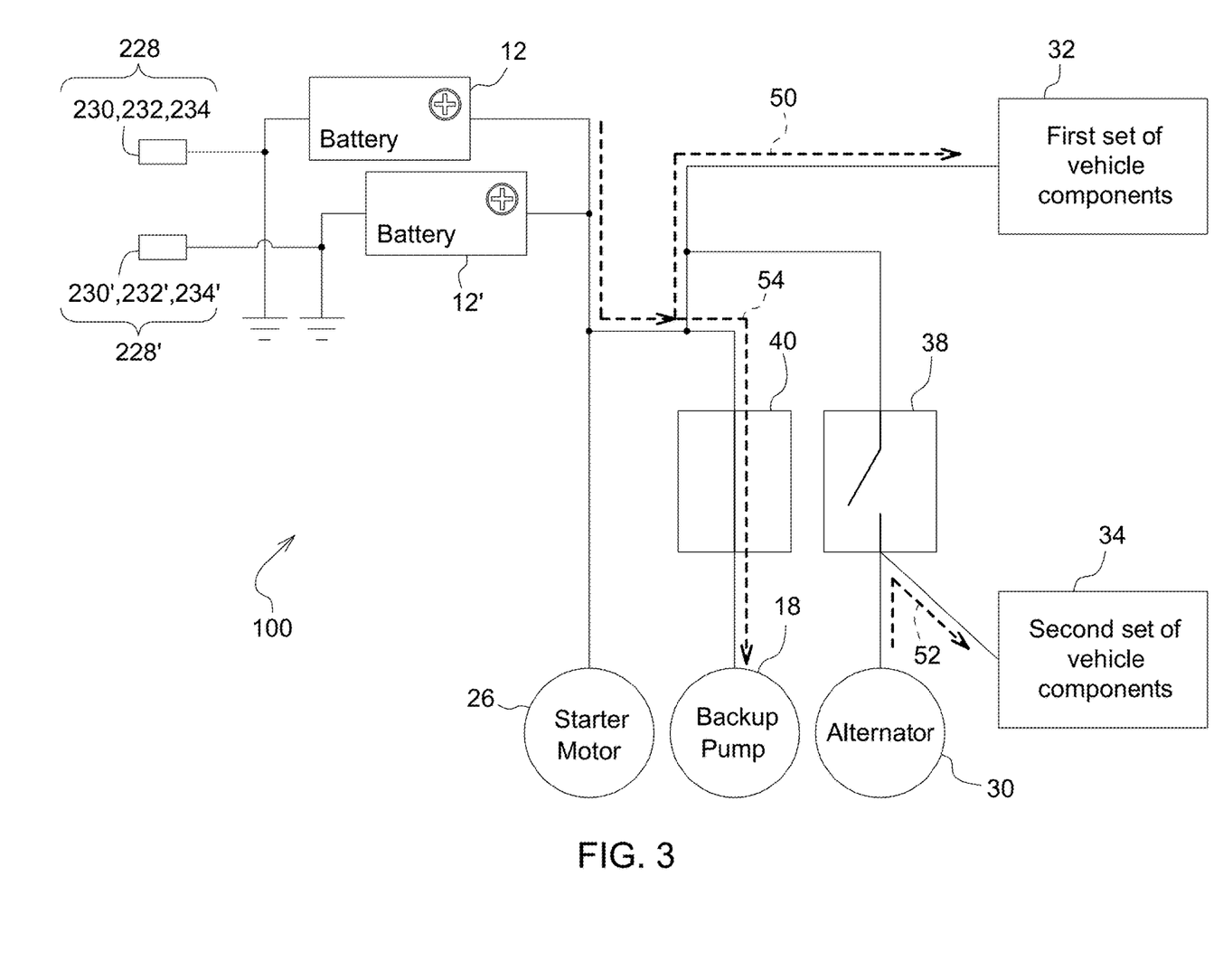
FIG. 3 is a schematic diagram illustrating a second condition of the battery load test system of the utility vehicle of FIG. 1.

The utility vehicle 10 may include an alternator 30 electrically connectable to charge the battery 12. The battery 12 may be operable to provide power to the starter motor 26 and the backup pump 18, as well as a first set of vehicle components 32 and a second set of vehicle components 34 (FIGS. 2-3). In some implementations, where the primary pump 16 is electrically driven, the battery 12 may also be operable to provide power to the primary pump 16.

The first set of vehicle components 32 may include controllers and interfaces, which may be located in the cabin 28 or in any other suitable location. In one example, the first set of vehicle components 32 includes the controller 200 described in greater detail below. The first set of vehicle components 32 may additionally or alternatively include other components or controllers (which may be integrated with or separate from the controller 200) such as a steering and braking controller, a CAB controller including transmission interface logic, an automatic temperature controller, a radio, an armrest controller, etc. The second set of vehicle components 34 may include the primary pump 16 and/or other components. The second set of vehicle components 34 may include other components or controllers (which may be integrated with or separate from the controller 200), such as an engine controller (ECU), a steering and braking controller, a vehicle controller, etc. In other examples, the first set of vehicle components 32 and the second set of vehicle components 34 may each include any suitable combination of components.

Figure 4:
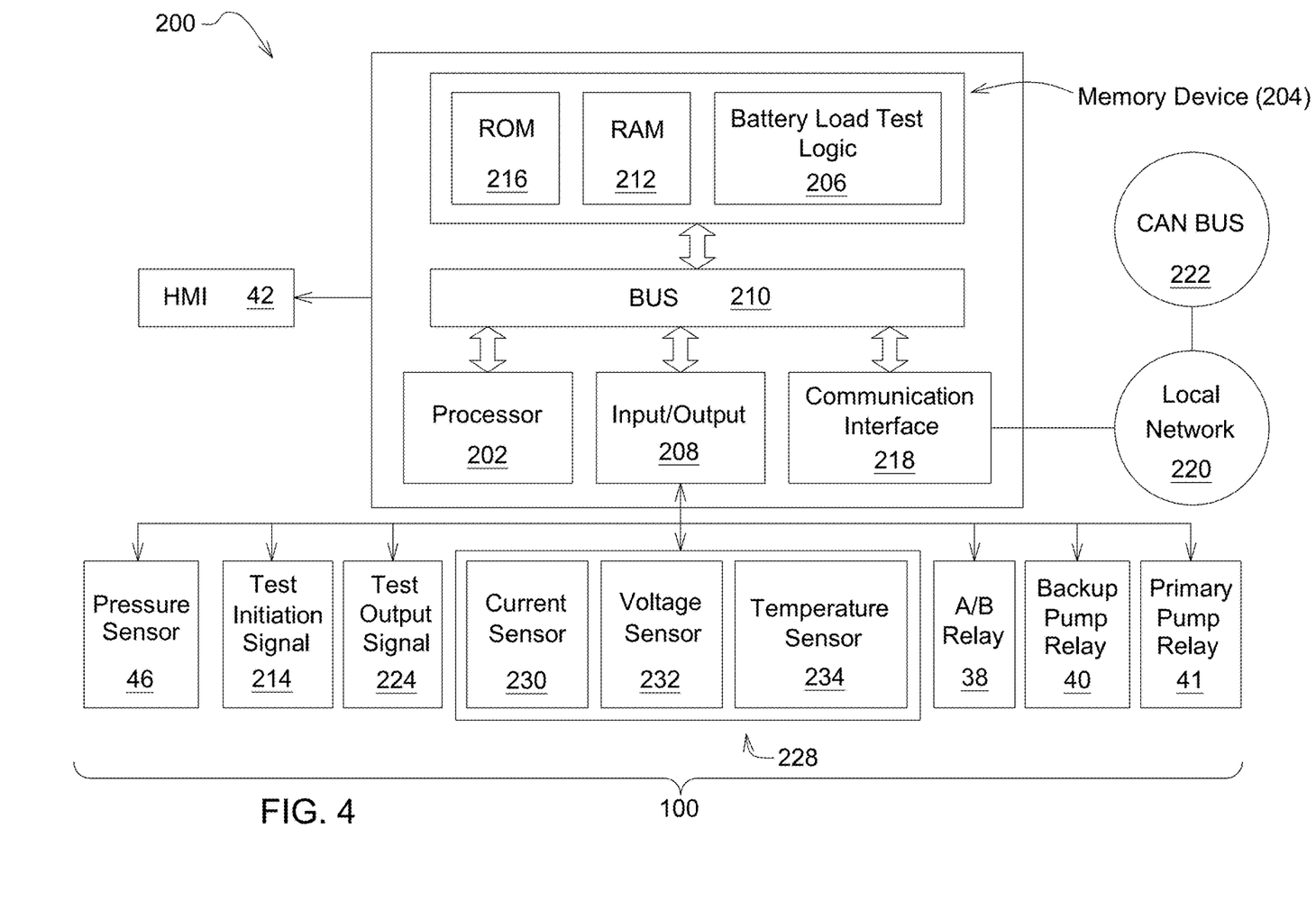
FIG. 4 is a block diagram of a controller associated with the battery load test system of the utility vehicle of FIG. 1.

With reference to FIGS. 1 and 4, the utility vehicle 10 also includes a human-machine interface (HMI) 42 (e.g., including a display and input members, such as any combination of one or more of buttons, dials, joysticks, mouse pads, a touch screen, a graphical user interface, or the like) with which the operator can input settings, preferences, commands, etc. to control the utility vehicle 10. The operator may also input settings, preferences, commands, etc. remotely. For example, the utility vehicle 10 may be in remote two-way communication with an operations center 44 located remotely from the utility vehicle 10, e.g., by wireless electronic signals such as but not limited to satellite, internet, mobile telecommunications technology, Bluetooth, radio, a frequency, a wavelength, etc. A remote operator at the operations center 44 may send and receive signals to and from the utility vehicle 10. The operations center 44 may include a controller having a memory device and a processor configured as described with respect to the controller 200 disclosed herein. Thus, the operations center 44 may receive and store data sent by the utility vehicle 10, as well as other utility vehicles. A group of utility vehicles may be referred to herein as a fleet of utility vehicles, regardless of ownership. For example, each vehicle in the fleet may have a common characteristic, such as being from the same manufacturer or being equipped to broadcast the same type of data to the operations center 44 so the operations center 44 can analyze trends across the population of vehicles (at a population level).

A battery load test system 100 may be employed to test the ability of the battery 12 to generate a high current (also referred to herein as "battery health"). The battery load test system 100 may include a battery current sensor 230, a battery voltage sensor 232, and a battery temperature sensor 234. The battery sensors 230, 232, 234 may be coupled to the battery 12 to measure battery current, battery voltage, and battery temperature, respectively. The battery sensors 230, 232, 234 may be configured to sense these conditions from the battery negative terminal. In the illustrated example, the battery sensors 230, 232, 234 may be configured as a single sensor unit 228. However, in other implementations, separate battery sensors 230, 232, 234 could be used for some or all of the measurements. The vehicle 10 may include more than one battery and more than one sensor(s). For example, the vehicle 10 may include a second battery 12' and corresponding battery sensors 230', 232', 234' which may be configured as a single sensor unit 228'. Thus, the battery load test system 100 may be used to test more than one battery 12.

The battery load test system 100 also includes an alternator/battery relay 38 and a backup pump relay 40. The alternator/battery relay 38, when closed, provides electrical communication between the alternator 30 and the battery 12 such that the battery 12 is chargeable by the alternator 30. When open (FIGS. 2-3), the alternator/battery relay 38 electrically isolates the battery 12 from the alternator 30 such that the battery 12 is not charged. Also, when the alternator/battery relay 38 is open, the alternator 30 is operable to provide power to the second set of vehicle components 34 (bypassing the battery 12) while the battery 12 is operable to provide power to the first set of vehicle components 32. The backup pump relay 40, when open (FIG. 2), disconnects power to the backup pump 18 such that the backup pump 18 is OFF. When closed (FIG. 3), the backup pump relay 40 allows current to flow from the battery 12 to the backup pump 18.

Additionally or alternatively, the battery load test system 100 may include a primary pump relay 41 (for implementations where the primary pump 16 is driven electrically) configured to be operable and controllable in the same way as the backup pump relay 40 described herein. The primary pump relay 41 may be used to electrically connect the battery 12 to the primary pump 16 during a battery load test.

Operation of the primary pump 16 and the backup pump 18 may be controllable via a controller 200. The controller 200 may include a bus 210 or other communication mechanism for communicating information and a processor 202 coupled with the bus 210 for processing information. The controller 200 includes a main memory 204, which may comprise random access memory (RAM) 212 or other dynamic storage devices for storing information and instructions such as battery load test logic 206 to be executed by the processor 202, and read only memory (ROM) 216 or other static storage device for storing static information and instructions for the processor 202. The main memory 204 may be a non-transitory, non-volatile memory device and operable to store information and instructions executable by the processor 202. The controller 200 can be programmed in a way that sets the duration of testing intervals and/or allows an operator to initiate a battery load test when such battery information is desired (e.g., when there are concerns about battery health). The term "controller" as used herein may encompass a single controller or a group of controllers in communication with each other, in which case each controller in the group of controllers need perform only a portion of the functionality of the controller 200. The term "operator" as used herein is meant to encompass a vehicle operator (such as a driver, farmer, vehicle owner, etc.), a dealer of utility vehicles, a service technician, and/or another individual or entity associated with the storage, use, sale, maintenance, or repair of the utility vehicle 10. A pressure sensor 46 (FIG. 1) may be configured to measure a fluid pressure associated with fluid pressurized by the backup pump 18 and send corresponding signals (e.g., data signals) to the controller 200.

The controller 200 includes an input/output 208 for receiving input signals (e.g., data signals) from the sensors 46, 230, 232, 234 and providing output control signals. The controller 200 may be configured to control the alternator/battery relay 38 and the backup pump relay 40 for the battery load test. The controller 200 may also be programmed to set battery load test intervals or to set conditions for performing the battery load test, which may be programmed into the battery load test logic 206. Additionally, the controller 200 and, in particular a communication interface 218 of the controller 200, may be used to report a failed battery load test (or other battery health information) to a local network 220 and CAN bus 222. The communication interface 218 may communicate the battery load test results wirelessly to a remote location, such as the operations center 44. The controller 200 may also send a signal to the HMI 42 to visually display the failed test (or other battery health information). For example, the HMI 42 may display an error code, error symbol, or error description on the display screen.

The controller 200 may additionally or alternatively be configured to control the primary pump relay 41 in the same way as the backup pump relay 40 described herein to additionally or alternatively run a battery load test using the primary pump 16 as the load. In such implementations, the primary pump 16 is electrically drivable.

As illustrated in FIGS. 1 and 4, the HMI 42 is operatively coupled with the controller 200. The controller 200 is configured to receive signals from the HMI 42 (e.g., control signals) and send signals to the HMI 42 (e.g., display signals). Signals, as used herein, may include wired electronic signals (e.g., by circuit or wire), wireless electronic signals (e.g., by satellite, internet, mobile telecommunications technology, Bluetooth, radio, a frequency, a wavelength), or the like.

In some implementations, the controller 200 may be located in a separate control box of the vehicle 10. In other implementations, the battery load test system 100 and corresponding battery load test logic 206 are incorporated with existing controllers of the vehicle 10 such as, for example, the steering and brake control system controller(s). Advantageously, the steering and brake control system controller(s) is already configured to control the alternator/battery relay 38, control of which is needed to perform the battery load test, though other controllers may be used and configured accordingly. In some implementations, control of the battery load test system 100 may be assigned to one or more of the redundant safety critical controllers on the tractor. In this manner, the battery load test system 100 comprises part of the steering and brake control system controller(s) such as, for example, the A and B box on a tractor. Thus, the battery load test system 100 also includes the battery load test logic 206 associated with the controller 200.

Figure 5:
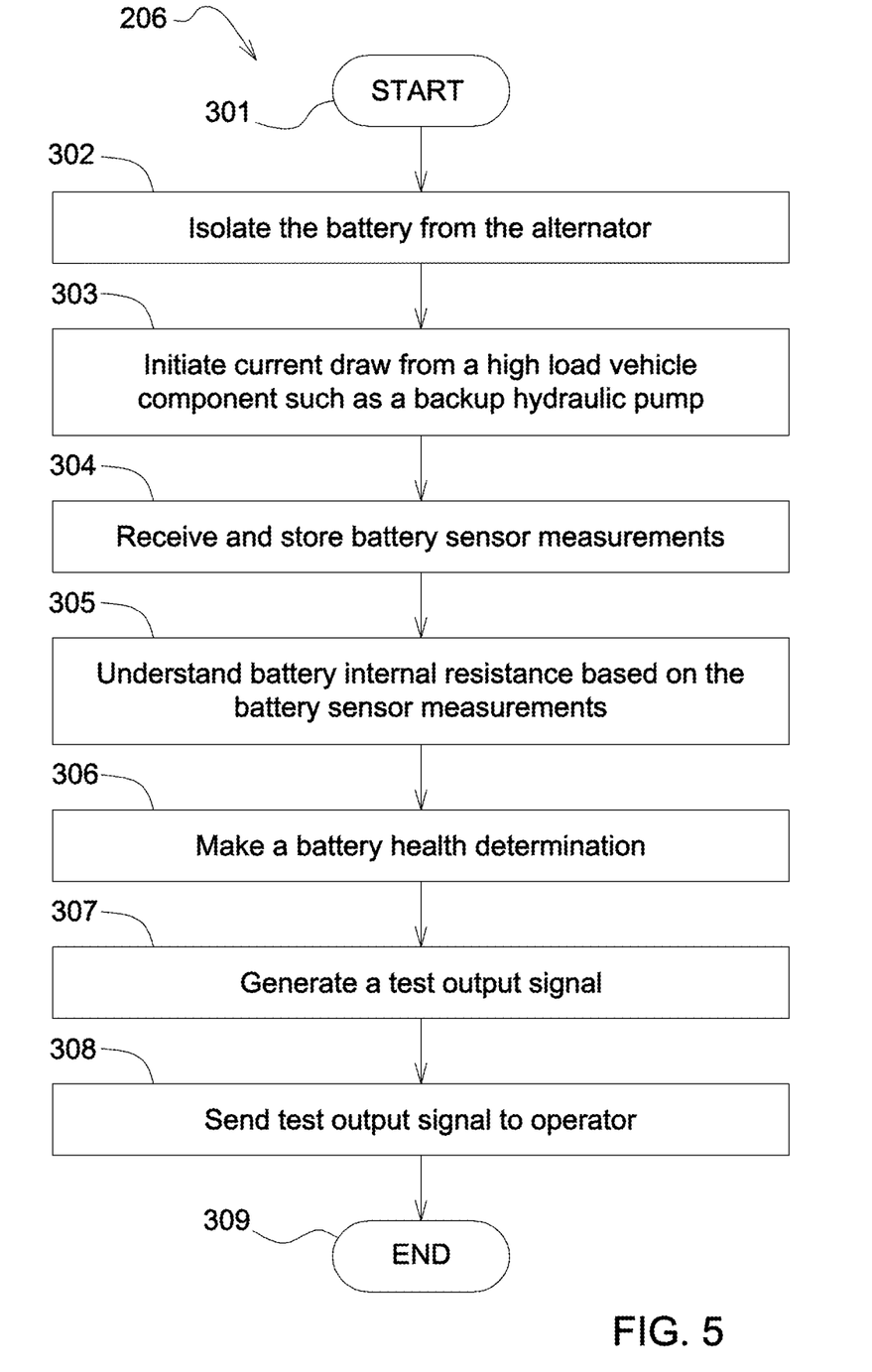
FIG. 5 is a flow chart illustrating battery load test logic associated with the battery load test system of the utility vehicle of FIG. 1.

FIG. 5 illustrates at least a portion of the battery load test logic 206 in flow chart form. Though steps 302-308 are described in sequential order herein, the steps 302-308 may be performed in other suitable orders, some steps 302-308 may be performed at the same time, and some steps 302-308 may be omitted. It should be understood that any numbering or lettering used herein to list steps, methods, or processes is used for purposes of separating items in a list and does not imply any particular order to the listed steps, methods, or processes.

At step 301, the battery load test starts. The battery load test may be performed at any known time. For example, the load test may be performed in response to a predetermined load test trigger condition being met and/or in response to a test initiation signal 214 inputted by an operator, either inputted onboard (e.g., using the HMI 42) or remotely (e.g., from the operations center 44). The predetermined load test trigger condition may be programmed into the battery load test logic 206. For example, the battery load test logic 206 may automatically trigger a test when the vehicle is running and in park and/or other conditions have been met. In another example, the battery load test logic 206 may automatically trigger a test when the vehicle is running and in motion (e.g., first motion of the vehicle) and/or other conditions have been met. The other conditions may include predetermined intervals of time, a vehicle startup condition, and/or at predetermined times of the day such as the end of the day (because it may be useful to know the battery health right before the next day's vehicle engine startup), and/or at any other predetermined state and/or predetermined time.

Triggering the test while the vehicle 10 is running is advantageous so the test does not deplete the charge of the battery 12 before the next engine startup, though the test could be performed when the vehicle 10 is not running. The battery load test is an onboard test conducted without an external testing device (e.g., external electrodes, an external load device, etc.) for the primary purpose of testing the battery being brought into contact with the utility vehicle 10. The component used to load the battery during the battery load test is already onboard the vehicle 10 and/or the sensor(s) used to take measurements during the battery load test are already onboard the vehicle. "Onboard" may include the use of an implement attached to the vehicle 10 as the battery test load component. The implement may be attached to the vehicle 10 for the primary purpose of performing work, such as lifting, loading, pushing, cutting, boring, moving, conveying, collecting, etc., with the use thereof as a battery test load being secondary. The term "onboard" as used herein may encompass systems in which the controller(s) performing some or all of the battery load test is/are disposed onboard and/or remotely from the vehicle 10 by wireless communication.

Upon initiation of the test, at step 302, the battery 12 is isolated from the alternator 30. Isolating the battery circuit separates the battery 12 from charge current supplied by the alternator 30 such that the battery 12 is not charged during the test. To isolate the battery 12, the battery load test logic 206 is programmed to open the alternator/battery relay 38, as illustrated in FIG. 2. In other implementations, the battery load test logic 206 may be programmed to set the alternator 30 to an OFF condition in order to run the battery load test. While the battery 12 is isolated, the first set of vehicle components 32 may draw current 50 from the battery 12. The first set of vehicle components 32 may include controllers, including the controller 200. The second set of vehicle components 34 draws current 52 directly on the alternator 30 while the battery 12 is isolated, as illustrated in FIG. 2.

Once the battery 12 is free of charge current, at step 303, the battery load test logic 206 is programmed to initiate a high load vehicle component current draw on the battery 12. In the illustrated example, the high load vehicle component may be the backup pump 18 onboard the utility vehicle 10. Using a backup pump advantageously allows the test to occur while the engine of the utility vehicle 10 is running and without disruption to the operation of the utility vehicle 10, though it is possible to run the test using other high load components and obtain useful results. To initiate a high current draw 54, the battery load test logic 206 is programmed to close the backup pump relay 40 as illustrated in FIG. 3, which establishes an electrical connection between the battery 12 and the backup pump 18. The first set of vehicle components 32 may continue their current draw 50 on the battery 12 during the test, as illustrated. Additionally or alternatively, the battery load test may be run using the primary pump 16 as the high load component (where the primary pump 16 is electrically driven) by closing the primary pump relay 41. Additionally or alternatively, the battery load test may be run using an implement, a heater, and/or another relatively consistent electrical load as the high load component.

After the high current draw is initiated, at step 304, the controller 200 receives and stores sensor data from the battery sensors 230, 232, 234 corresponding to battery current, battery voltage, and battery temperature respectively. The battery measurements may be taken during the high current draw 54. The battery measurements are indicative of the internal resistance of the battery 12. The battery load test logic 206 may be programmed to store the battery measurements into the main memory 204 and/or into a remote memory device such as one at the operations center 44, a mobile device, etc.

At step 305, the battery load test logic 206 may be programmed to understand battery internal resistance based on the battery measurements. For example, the battery load test logic 206 may be programmed to use the battery measurements to calculate the internal resistance or, alternatively, may rely on a corresponding value (e.g., voltage, a combination of voltage and current, etc.) to inform a battery health determination based on said value(s) related to internal resistance without fully calculating internal resistance. The battery sensors 230, 232, 234 are configured to measure voltage in response to a current load at a measured temperature. Each time the battery load test is executed (e.g., each test interval), the internal resistance of the battery 12 may be understood based on the battery sensor measurements. Internal resistance is generally higher when the battery 12 is cold. Having the battery temperature measurement is advantageous to understand whether poor test results are due to the battery 12 degrading or being cold. The battery load test logic 206 may be programmed to store the battery measurements, battery health values, and/or calculations (battery data) into the main memory 204 and/or into a remote memory device such as one at the operations center 44, a mobile device, etc.

At step 306, the battery load test logic 206 may be programmed to make a battery health determination based on the battery data. The battery load test logic 206 may be programmed to make a battery health determination based on the battery data tracked over time. For example, if the internal resistance of the battery 12 appears to be increasing over time and the battery temperature is not decreasing over time, then a negative battery health determination may be made (such as a fail or a low score). (Low battery temperatures can increase internal resistance, so if low temperature can be ruled out as a cause of increasing internal resistance by tracking the data over time, then this helps make a battery health determination.) The battery data from a single utility vehicle 10, or from more than one utility vehicle 10, may be analyzed for trends to better understand battery health based on these measurements. The battery health determination may include a battery health score (e.g., on a scale), a pass or fail, a combination of both, etc.

At step 307, the battery load test logic 206 may be programmed to generate a test output signal 224 based on the battery health determination to be sent to the operator at step 308 (e.g., to the HMI 42, by wireless communication, to the operations center 44, etc.). The test output signal 224 may include information for the operator about the battery health determination, such as the current battery health (e.g., a health score), the battery health over time, a battery pass indication, a battery failure warning, a battery replacement recommendation, etc. The test output signal 224 may provide the information in words, symbols, indicia, pictures, sounds, a light, etc., or any combination thereof. The test output signal 224 may additionally or alternatively activate an alert device such as, for example, an audible alarm and/or flashing light to notify the operator of the test results. The test output signal 224 need not be generated and/or sent every time the load test is executed. In some implementations, the test output signal 224 is only generated and sent when there is a concern about the battery health (e.g., negative test results) and/or when an operator initiates the battery load test. In other implementations, the test output signal 224 is generated and sent each time the battery load test is executed. After the test output signal 224 is sent, the battery load test ends at 309. However, the battery load test may end after step 306 if there is no need to generate and send the test output signal 224.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

The teachings may be described herein in terms of functional and/or logical block components or various processing steps, which may be comprised of any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Thus, the disclosure provides, among other things, a battery load test system for conducting an onboard battery load test using a high load component of the utility vehicle while the utility vehicle is running. Various features and advantages of the disclosure are set forth in the following claims.

What is claimed is:

1. An onboard battery load test system for a utility vehicle, the onboard battery load test system comprising:
    a vehicle battery;
    an alternator configured to charge the vehicle battery with an alternator charge current;
    a primary pump disposed in a fluid circuit and configured to pressurize a fluid in the fluid circuit;
    a backup pump disposed in the fluid circuit as a redundancy to the primary pump;
    wherein the fluid circuit is a hydraulic steering circuit, the primary pump is a primary steering pump, and the backup pump is a hydraulic backup steering pump;
    at least one battery sensor operable to generate a battery sensor signal representative of a condition of the vehicle battery; and
    a controller operatively coupled with the at least one battery sensor, the controller including a processor, a memory device operatively coupled with the processor, and battery load test logic stored in the memory device and being executable via the processor to determine health of the vehicle battery by:
(i) isolating the vehicle battery from the alternator charge current;
(ii) initiating a current draw on the vehicle battery by the backup pump while the vehicle battery is isolated from the alternator charge current and while the utility vehicle is running without disruption to an operation of the vehicle,
(iii) receiving the battery sensor signal, and
(iv) determining the battery health based on the battery sensor signal.

2. The onboard battery load test system of claim 1, wherein the condition of the vehicle battery includes one or more of a battery current, a battery voltage, or a battery temperature.

3. The onboard battery load test system of claim 1, wherein the condition of the vehicle battery includes a battery current, a battery voltage, and a battery temperature.

4. The onboard battery load test system of claim 1, wherein determining the battery health includes tracking battery sensor signals over time.

5. The onboard battery load test system of claim 1, wherein the condition of the vehicle battery includes battery temperature, and wherein determining the battery health is based on the battery temperature.

6. The onboard battery load test system of claim 1, wherein initiating current draw on the vehicle battery by the backup pump includes closing a backup pump relay to establish an electrical connection between the vehicle battery and the backup pump.

7. The onboard battery load test system of claim 1, wherein the battery load test logic stored in the memory device is further executable by the processor to generate a test output signal based on the battery health.

* * * * *